United States Patent [19]
Goliaszewski et al.

[11] Patent Number: 5,466,381
[45] Date of Patent: Nov. 14, 1995

[54] METHOD OF SCAVENGING OXYGEN FROM AN AQUEOUS MEDIUM

[75] Inventors: Alan E. Goliaszewski, The Woodlands, Tex.; Michael A. Cady, Yardley, Pa.; Paul R. Burgmayer, Wayne, Pa.; Sydia B. Anderson, Doylestown, Pa.; William S. Carey, Ridley Park, Pa.; Roger D. Moulton, Yardley, Pa.

[73] Assignee: Betz Laboratories, Inc., Trevose, Pa.

[21] Appl. No.: 326,451

[22] Filed: Oct. 20, 1994

[51] Int. Cl.$^6$ ............................................. C02F 5/02
[52] U.S. Cl. ...................... 210/750; 210/757; 252/180; 252/80; 252/188.2
[58] Field of Search ................... 252/180, 181, 252/80, 82, 188.2; 210/696, 700, 750, 749, 757

[56] References Cited

U.S. PATENT DOCUMENTS

| | | | |
|---|---|---|---|
| 4,289,645 | 9/1981 | Muccitelli | 252/178 |
| 4,897,220 | 1/1990 | Trieselt et al. | 252/546 |
| 5,098,836 | 3/1992 | Stahl et al. | 435/121 |
| 5,167,835 | 12/1992 | Harder | 210/750 |
| 5,256,311 | 10/1993 | Rossi et al. | 210/750 |
| 5,271,847 | 12/1993 | Chen et al. | 210/697 |
| 5,384,050 | 1/1995 | Kelley | 210/750 |

*Primary Examiner*—Prince Willis, Jr.
*Assistant Examiner*—J. Silbermann
*Attorney, Agent, or Firm*—Alexander D. Ricci; Richard A. Paikoff

[57] ABSTRACT

An improved oxygen scavenger for aqueous mediums is disclosed which is a disubstituted, water soluble azo compound.

6 Claims, No Drawings

METHOD OF SCAVENGING OXYGEN FROM AN AQUEOUS MEDIUM

FIELD OF THE INVENTION

The present invention relates to oxygen scavengers for aqueous systems. More particularly, the present invention relates to the use of nitrogen-based initiators as oxygen scavengers in aqueous systems such as boiler systems.

BACKGROUND OF THE INVENTION

From a corrosion point of view, the presence of certain dissolved gases, even in small amounts, is undesirable in water systems which contact metal surfaces. For example, metal surfaces in contact with oxygen containing water can experience severe pitting in industrial water systems. Pitting is highly localized corrosion affecting only a small area of the total metal surface. This can be a serious problem, causing metal failure even though only a small amount of metal is lost and the overall corrosion rate is relatively low.

With respect to oxygen, the severity of attack will depend upon the concentration of dissolved oxygen in the water, pH and temperature. As water temperature increases, as for example in a water heating system such as a boiler, enough driving force is added to the corrosion reaction that small amounts of dissolved oxygen in the water can cause serious problems. Oxygen pitting is considered a most serious problem in boiler systems, even where only trace amounts of oxygen are present.

Deaeration is a widely used method for removing oxygen from an oxygen-containing aqueous medium. It is particularly useful for treating boiler feedwater and can be either mechanical or chemical.

While vacuum deaeration has proven to be a useful mechanical deaeration method for treating water distributing systems, boiler feedwater is treated using pressure deaeration steam as the purge gas. According to the pressure deaeration method for preparing boiler feedwater, the water is sprayed into a steam atmosphere and is heated to a temperature in which the solubility of oxygen in the water is low. Typically, greater than 99% of oxygen in the feedwater is released to the steam and is purged from the system by venting.

Mechanical deaeration is considered an important first step in removing dissolved oxygen from boiler feedwater. However, as already noted, as water temperature increases, even trace amounts of dissolved oxygen can cause serious problems. Accordingly, supplemental chemical deaeration is required.

For boilers operating below 1000 pounds per square inch (psi), catalyzed sodium sulfite is commonly used as an oxygen scavenger for the chemical deaeration of the feedwater. The oxygen/sulfite reaction can be effectively catalyzed by iron, copper, cobalt, nickel, and/or manganese. While the sodium sulfite oxygen scavenger is often used with success, this material does have recognized limitations. At boiler operating pressures of 900 to 1000 psi and above, increased dissolved solids from the sulfite/oxygen reaction product can become a significant problem. Also, at high pressures the sulfite decomposes in the boiler to form sulfur dioxide and hydrogen sulfide, both of which can cause corrosion in the return condensate system.

Hydrazine is also used as an oxygen scavenger. Hydrazine does not have the above noted high pressure limitation of sodium sulfite. For example, since the products of the hydrazine/oxygen reaction are water and nitrogen, no solids are added to the boiler water. Hydrazine as an oxygen scavenger does, however, have its own limitations. A major problem relates to the toxicity of hydrazine. Also, the hydrazine/oxygen reaction is very slow at low temperatures which may be encountered in some sections of a boiler system. The decomposition products of hydrazine are ammonia and nitrogen. The ammonia can be aggressive to copper or copper bearing metallurgies that are found in condensate systems.

In recent developments, the use of certain compounds such as dioxo-aromatic compounds or organically substituted derivatives thereof has become known. The group "dioxo-aromatic" consists of benzoquinone, napthoquinone, hydroquinone and catechol. The phrase "organically substituted derivatives thereof" includes any dioxo-aromatic compound having an organic substituent with a carbon atom attached directly to the aromatic ring. An example of such a derivative is 4-tertbutylcatechol. The use of quinones and diols as catalysts for the hydrazine/oxygen reaction in an aqueous medium is well known. See, for example, U.S. Pat. No. 3,551,349. U.S. Pat. No. 3,843,547 discloses the use of a combination of an aryl amine compound and a quinone compound as a catalyst for a hydrazine oxygen scavenger.

SUMMARY OF THE INVENTION

The present invention is directed to the discovery that nitrogen-based initiators of radical processes, namely azo compounds, act as effective oxygen scavengers. The preferred compounds of the present invention include disubstituted azo compounds such as 2,2-azobis (N,N'-dimethyleneisobutyramidine), 2,2-azobis (isobutyramide) dihydrate, 2,2-azobis (N,N'-dimethylene isobutyramidine)•2HCI, 4,4-azobis (4-cyanopentanoic acid) and 2,2-azobis (2-amidinopropane)•HCI.

DESCRIPTION OF THE PREFERRED EMBODIMENTS

The present inventors have discovered that certain azo compounds having some degree of water solubility provide improved oxygen scavenging under conditions encountered in a typical boiler system. The compounds of the present invention may be further described as water-soluble azo compounds with a certain range of decomposition temperatures (DT). The performance of these azo compounds to scavenge oxygen likely results from their ability to generate free radicals in solution when thermally stressed. The reaction of free radicals with oxygen is particularly facile compared to alternative reactions possible in the boiler waters. The appropriate azo compounds need to be chosen to generate a sustained population of radical species for a given application temperature in order to be effective. The DT is the temperature at which the half-life of the original chemical is ten hours. Note that the only water-soluble azo compound that was not effective (2-(carbamoylazo) isobutyronitrile) possesses a higher decomposition temperature (104° C.) than the other compounds tested.

The compounds of the present invention show similar reactivity at low (6.5) and high (9.0) pH, i.e., the compounds are relatively pH-independent, an advantage over currently used scavengers. The compounds also show excellent reactivity in the temperature range over which they are required to work (about 145° F. to 300° F., preferably from about 150° F. to 310° F., depending on the particular scavenger used). The reactivity of many of the scavengers currently commercially available (e.g., hydrazine, diethylhydroxylamine, methylethylketoxime) drops off as the reaction temperature drops. Most of these are ineffective at 185° F. Furthermore, in contrast to other commercially available scavengers, the compounds of the present invention are not dependent on copper or any other catalyst for effective scavenging performance. The compounds of the present invention may either be used individually, or in combination depending upon the particular application, and may be added to an aqueous system in amounts ranging from about 5 parts per billion up to about 100 parts per million, preferably from about 30 parts per billion up to about 10 parts per million.

The present invention will now be further described with reference to a number of specific examples which are to be regarded as illustrative and not as restricting the scope of the invention.

TEST METHOD UTILIZED

Experiments which approximate typical deaerator conditions were run in a moderate temperature scavenging test apparatus similar to those described in U.S. Pat. No. 4,289,645, incorporated herein by reference. The numbers shown in the following tables are based upon the average percent oxygen decrease caused by each scavenger.

Test Conditions for Tables I and II pH adjustment with diethanolamine
Water: air saturated, demineralized
Scavenger concentration: $4.6 \times 10^{-6}$ molar

| Key for Tables I and II | Abbreviation |
|---|---|
| 2,2-azobis (N,N'-dimethyleneisobutyramidine) | A |
| 2,2-azobis (isobutyramide) dihydrate | B |
| 2,2 azobis (N,N'-dimethyleneisobutyramidine).2HCl | C |
| 4,4-azobis (4-cyanopentanoic acid) | D |
| 2,2-azobis (2-amidinopropane).HCl | E |

TABLE I

Model Deaerator Results for Free Radical Scavengers (pH 9.0) (Water Soluble Azo Compounds)

| Treatment | Average % $O_2$ Decrease (275° F.) | Average % $O_2$ Decrease (185° F.) |
|---|---|---|
| A | 81 | 68 |
| B | 97 | 0 |
| C | 99 | 73 |
| D | 98 | 20 |
| E | 98 | 29 |
| Hydroquinone (control) | 35 | — |

The data in Table I shows the above-mentioned compounds gave excellent oxygen scavenging at 275° F., pH 9. In each case, the scavenging performance was better than hydroquinone at pH 9.0, temperature 275° F., 6 minutes reaction time in the absence of any catalysts such as copper.

TABLE II

Model Deaerator Results for Free Radical Scavengers (pH 6.5) (Water Soluble Azo Compounds)

| Treatment | Average % $O_2$ Decrease (275° F.) |
|---|---|
| A | 99 |
| B | 99 |
| C | 100 |
| D | 99 |
| E | 100 |
| Hydroquinone (control) | 0 |

As shown in Table II, the activity of these compounds is relatively pH-independent. The results for pH 6.5 were essentially the same as for pH 9.0. Note that hydroquinone shows essentially no reactivity at low pH.

While this invention has been described with respect to particular embodiments thereof, it is apparent that numerous other forms and modifications of this invention will be obvious to those skilled in the art. The appended claims and this invention generally should be construed to cover all such obvious forms and modifications which are in the true spirit and scope of the present invention.

What is claimed is:

1. A method of reducing the amount of oxygen in an oxygen containing aqueous medium comprising adding to said oxygen containing aqueous medium an amount, effective for the purpose, of a disubstituted, water soluble azo compound.

2. The method as recited in claim 1 wherein said compound is selected from the group consisting of 2,2-azobis (N,N'-dimethyleneisobutyramidine), 2,2-azobis (isobutyramide) dihydrate, 2,2-azobis (N,N'-dimethylene isobutyramidine)•2HCl, 4,4-azobis (4-cyanopentanoic acid) and 2,2-azobis (2-amidinopropane)•HCl.

3. The method as recited in claim 1 wherein said compound is added to said aqueous medium in an amount of from about 5 parts per billion up to about 100 parts per million.

4. The method as recited in claim 1 wherein the temperature of said aqueous medium is from about 150° F. to about 310° F.

5. The method as recited in claim 3 wherein said compound is added to said aqueous medium in an amount of from about 30 parts per billion up to about 10 parts per million.

6. The method as recited in claim 1 wherein said aqueous medium is a boiler system.

* * * * *